(12) United States Patent
Marchiando et al.

(10) Patent No.: US 8,034,153 B2
(45) Date of Patent: Oct. 11, 2011

(54) WEAR RESISTANT LOW FRICTION COATING COMPOSITION, COATED COMPONENTS, AND METHOD FOR COATING THEREOF

(75) Inventors: Robert Marchiando, Twinsburg, OH (US); Jon Leist, North Olmsted, OH (US)

(73) Assignee: Momentive Performances Materials, Inc., Albany, NY (US)

( * ) Notice: Subject to any disclaimer, the term of this patent is extended or adjusted under 35 U.S.C. 154(b) by 783 days.

(21) Appl. No.: 11/614,293

(22) Filed: Dec. 21, 2006

(65) Prior Publication Data

US 2007/0227299 A1     Oct. 4, 2007

Related U.S. Application Data

(60) Provisional application No. 60/753,342, filed on Dec. 22, 2005, provisional application No. 60/744,752, filed on Apr. 13, 2006.

(51) Int. Cl.
*C22C 29/14* (2006.01)
*C22C 29/16* (2006.01)

(52) U.S. Cl. ............. 75/244; 419/12; 419/13; 419/35; 419/64; 419/65; 501/96.4

(58) Field of Classification Search ............ 75/300, 75/230, 244; 419/12, 13, 35, 64, 65; 501/96.4; 508/155

See application file for complete search history.

(56) References Cited

U.S. PATENT DOCUMENTS

| | | | | |
|---|---|---|---|---|
| 4,008,183 A | * | 2/1977 | Ishii et al. ................. | 252/512 |
| 4,248,814 A | * | 2/1981 | Yajima et al. ............. | 264/624 |
| 4,419,130 A | | 12/1983 | Slaughter ................... | 75/213 |
| 4,528,120 A | * | 7/1985 | Hunold et al. ............. | 252/516 |
| 4,690,796 A | | 9/1987 | Paliwal ...................... | 419/12 |
| 4,710,348 A | | 12/1987 | Brupbacher et al. ...... | 420/590 |
| 4,751,048 A | | 6/1988 | Christodoulou et al. . | 420/129 |
| 4,754,494 A | | 6/1988 | Kumar ........................ | 384/112 |
| 4,755,221 A | | 7/1988 | Paliwal et al. ............. | 75/244 |
| 4,915,908 A | | 4/1990 | Nagle et al. ................ | 420/590 |
| 5,007,962 A | | 4/1991 | Osborne ..................... | 501/87 |
| 5,026,422 A | | 6/1991 | Osborne ..................... | 501/88 |
| 5,049,450 A | * | 9/1991 | Dorfman et al. ........... | 428/570 |
| 5,100,845 A | | 3/1992 | Montgomery et al. ... | 423/289 |
| 5,108,962 A | | 4/1992 | Khazai et al. .............. | 501/97 |
| 5,266,263 A | | 11/1993 | Hunold et al. ............. | 419/31 |
| 5,336,454 A | | 8/1994 | Montgomery et al. ... | 254/63 |
| 5,401,696 A | | 3/1995 | Montgomery et al. ... | 501/96 |
| 5,536,485 A | * | 7/1996 | Kume et al. ................ | 423/446 |
| 5,604,164 A | | 2/1997 | Montgomery et al. | |
| 5,637,816 A | | 6/1997 | Schneibel .................. | 75/240 |
| 5,702,769 A | | 12/1997 | Peters ......................... | 427/451 |
| 5,837,326 A | | 11/1998 | Dallaire et al. ............ | 427/449 |
| 5,837,327 A | | 11/1998 | Sue et al. ................... | 427/456 |
| 6,290,748 B1 | | 9/2001 | Jha et al. .................... | 75/684 |
| 6,447,896 B1 | | 9/2002 | Augustine .................. | 428/336 |
| 6,745,963 B2 | | 6/2004 | Jungling et al. ............ | 241/29 |
| 6,887,585 B2 | | 5/2005 | Herbst-Dederichs ...... | 428/546 |
| 6,994,475 B2 | | 2/2006 | Doll ............................ | 384/492 |
| 2005/0155454 A1 | | 7/2005 | Fiala et al. ................. | 75/252 |
| 2005/0287390 A1 | | 12/2005 | Hajmrle ..................... | 428/680 |

FOREIGN PATENT DOCUMENTS

CN     1358690        7/2002
EP     0440437 B1     4/1995

OTHER PUBLICATIONS

Ozdemir, O.; Sahin, F. Cinar; Yucel, O. Nitradation of Ti-B-Al-Al2O3 composite powder, High Temp. Mater. Processes, 2001, 20(5-6), 429-435.*
Journal of Thermal Spray Technology, Kodama et al., Reactive Thermal Spray by High-Velocity Jet and Characterization of the Coatings, vol. 8(4), Dec. 1999, 537-544.
Chinese Office Action (Translation), Application No. 200610064427.3, Momentive Performance Materials, Inc., Dec. 24, 2010.
Chinese Office Action (Translation), Application No. 200610064427.3, Momentive Performance Materials, Inc., Mar. 15, 2011.

* cited by examiner

*Primary Examiner* — Jerry A Lorengo
*Assistant Examiner* — Carlos Barcena
(74) *Attorney, Agent, or Firm* — Joseph E. Waters

(57) ABSTRACT

A composition for coating sliding or rolling or fretting or impacting members is formed by preparing a composite powder of TiB2 and BN, with a $TiB_2$ to BN ratio ranging from 1:7 to 20:1, and a metallic matrix selected from the group consisting of nickel, chromium, iron, cobalt, aluminum, tungsten, carbon and alloys thereof.

18 Claims, No Drawings

WEAR RESISTANT LOW FRICTION COATING COMPOSITION, COATED COMPONENTS, AND METHOD FOR COATING THEREOF

CROSS REFERENCE TO RELATED APPLICATIONS

This application claims priority to U.S. Patent Application No. 60/753,342, with a filing date of Dec. 22, 2005 and U.S. Patent Application No. 60/744,752, with a filing date of Apr. 13, 2006, which patent applications are fully incorporated herein by reference.

FIELD OF THE INVENTION

The present invention relates to a wear-resistant, low friction coating composition for use in contact surfaces, which coating composition can be applied via a processes known in the art, including but not limited to thermal spraying, plasma spraying, electroless or electrolytic metal plating onto the work piece.

BACKGROUND OF THE INVENTION

Coatings for use with contact surfaces are typically required to have superior molten metal corrosion resistance, heat resistance, thermal shock resistance, oxidation resistance, and wear resistance. Coating compositions vary depending on the specific applications, e.g., seals for gas turbine engines, sizing equipment, aircraft engine parts, forming tools, glass fiber processing parts, firearm parts (breech, a barrel, a choke, a flash suppressor, a gas port), etc. The compositions also vary depending on the function of the part or component, i.e., locking, ejection, sliding, rolling, rotating, impacting, or bearing, etc. Coating compositions in the prior art also vary depending on the final properties for the coating to impart, i.e., resistance to erosion, resistance to fretting and surface fatigue, resistance to abrasion, coating for hard bearing surfaces, coatings for soft bearing surfaces, thermal barrier or conductor, electrical insulator, abradability, low coefficient of friction or non-stick properties.

TiB2 is known to improve the fracture toughness of ceramic cutting tools and other components with a Knoop hardness of 3000 Kg/mm$^2$ and excellent oxidation resistance for temperatures of less than 1000° C. Of all the lubricants for use in coating compositions, BN is often used to provide abradability while maintaining erosion resistance. However, in some applications, customers have to elect as whether to have the lubrication property afforded by BN, or the toughness property for a coating composition without BN or a reduced amount of BN to get the desired wear resistance.

U.S. Pat. No. 5,837,327 discloses a thermal spray/plasma spray coating composition with sintered $TiB_2$ powder. U.S. Pat. No. 5,007,962 discloses a coating composition with BN and optionally with $TiB_2$ being added, for use in dipping, coating, spray painting, or painting applications. U.S. Pat. No. 6,994,475 discloses bearings and a coating composition containing a solid lubricant layer comprising lubricants such as BN, graphite, or PTFE and optionally with elements such as $TiB_2$, TiC, etc., with the optional elements being added to "impart desirable properties such as insensitivity to humidity and thermal stability." U.S. Pat. No. 5,026,422 discloses a powder-containing composition, such as a BN-containing composition for use as a film-forming coating on substrates, wherein $TiB_2$ powders could be added to BN powders to increase the electrical conductivity of the BN deposited coating or AlN powders could be added to BN powders to increase the thermal conductivity of the BN deposited coating.

In the manufacture of metallization boats, densified body of ceramic materials is machined into shaped articles. Cavities and/or grooves are then machined out of the shaped articles forming metallization boats. By the time metallization boats are finished according to specification, a substantial amount of scrap materials are generated. Additionally, boats not meeting specifications (for one manufacturer with >25 variables—see http://www.advceramics.com/geac/products/intermetallic_boats/), including electrical requirements and design specifications, are discarded as scrap materials as well. At the customers' site and depending on the type of boats, after a few hours in operation, some boats may begin to get corroded by molten metal with deep grooves which finally resulting in holes in the boat. At the point where there is non-uniformity in the metalized substrate due to the holes or there are holes in the boats due to metal spatter, the boats are typically replaced and discarded.

Applicants have noted that the components for use in the wear-resistant coating of the prior art are typically found in corrosion-resistant metallization boats. Applicants have also noted that scraps from corrosion-resistant metallization boats and used metallization boats are discarded in quantities, and that there are a number of applications requiring the materials typically used in metallization boats.

In one embodiment, the invention relates to a coating composition comprising a composite material with a balanced combination of low friction (lubricity) property from a material such as BN, and wear resistance (hardness) from a material such as $TiB_2$. In a second embodiment, the invention relates to a novel and innovative way to recycle scrap materials from metallization boats and/or side dams by making useful materials out of the discarded articles, e.g., milled particles of reduced sizes in the range of 1 to 1000 microns, e.g., for use a coating composition employing a hard material such as $TiB_2$ and a powdered solid lubricant such as BN, both components typically found in scrap materials from metallization boats and side dams.

BRIEF SUMMARY OF THE INVENTION

The invention relates to a method for coating a contact surface of a rolling or friction part with a composite powder of TiB2 and BN in a metal matrix, with the metal matrix comprising at least one of nickel, chromium, iron, cobalt, aluminum and alloys thereof, wherein the composite powder is prepared by heating a mixture of TiB2-BN composite in a metal matrix to between 850° C. and 1600° C. forming a sintered composite with a $TiB_2$ to BN ratio ranging from 1:7 to 20:1, and reducing the sintered composite to an average particle size ranging from 10 to 200 µm.

In another aspect, the invention relates to a coating composition for use on a contact surface, comprising a compound powder of a metallic matrix selected from nickel, chromium, iron, cobalt, aluminum, tungsten and alloys thereof and a composite powder of TiB2 and BN, with a $TiB_2$ to BN ratio ranging from 1:7 to 20:1.

In another aspect, the invention relates to coating applications for engine parts, bearing surfaces, forming tools, firearm parts, extruder parts, and the like, requiring improved wear resistance and friction modification properties, wherein the composition comprises solid particles having a median particle size in the range of 1 to 1000 µm, as recycled from discarded corrosion-resistant ceramic materials comprising: a) at least one of $TiB_2$, $ZrB_2$, TiN, SiC, $Cr_3C_2$, and mixtures thereof; and b) at least one of BN, AlN, $Si_3N_4$, nitride of a rare earth metal compound, alumina, silica, boric oxide, boron oxynitride, oxide of a rare earth metal compound, oxide of an alkaline earth metal, and mixtures thereof.

Lastly, the invention relates to sliding or rolling or fretting or impacting members having a base substrate and at least a coating layer comprising a compound powder mixture comprising a metallic matrix selected from the group consisting of nickel, chromium, iron, cobalt, aluminum and alloys thereof and a composite powder of TiB2 and BN, with a $TiB_2$ to BN ratio ranging from 1:7 to 20:1, wherein the coating layer comprises ceramic materials from recycled/discarded articles such as boats and side dams, the materials having an average primary particle size in the range of 1 to 1000 μm.

DETAILED DESCRIPTION OF THE INVENTION

As used herein, the terms "first," "second," and the like do not denote any order or importance, but rather are used to distinguish one element from another, and the terms "the", "a" and "an" do not denote a limitation of quantity, but rather denote the presence of at least one of the referenced item. Furthermore, all ranges disclosed herein are inclusive of the endpoints and are independently combinable.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases.

As used herein, the term "metallization boat" may be used interchangeably with "refractory boat," "evaporation boat," "evaporation vessel," "evaporator boat," "boats for metal evaporation," or simply "vessel" or "boat," referring to a heating source for metallization comprising a ceramic composite.

As used herein, a thermal or flame spray coating is a coating produced by a process in which molten or softened particles form a coating on a substrate. In one embodiment, the particles are softened after being applied onto the surface. In another embodiment, the particles are softened prior to being applied onto the surface.

Component A—Composite Powder Comprising $TiB_2$ and BN: As used herein, the term "composite material" may be used interchangeably with "composite powder," referring to a powder in which each particle consists of two or more distinct materials joined together (not the same as a powder blend), and wherein the resulting powder or material has different physical or chemical properties from a blend of the two or more distinct materials, e.g, a composite powder comprising $TiB_2$ and BN which has distinctively different properties from a blend of $TiB_2$ and BN. In the present invention, the inventive coating composition comprising a composite powder of $TiB_2$ and BN has distinctively different properties from coating compositions of the prior art, which may comprise $TiB_2$ and/or BN, and with optional addition of the other component.

Titanium diboride ($TiB_2$) inherently has an excellent hardness and high thermal and electrical conductivity, but suffers from moderate fracture toughness and bending strength. BN inherently exhibits a host of exceptional chemical, thermal, mechanical, and electrical properties—including excellent lubricating properties, improved thermal shock resistance, and resistance to attack by molten metals. However, the modest hardness of BN limits their use in demanding tribological applications especially under high abrasive loads. The coating composition of the invention employs a composite of $TiB_2$ and BN. The properties of the coatings produced with a $TiB_2$ and BN composite are superior to those produced with simply blended powders without sintering. The coatings of the invention display a balanced combination of the best properties of both materials.

In one embodiment, the composite powder comprises BN and $TiB_2$ is manufactured from virgin materials, e.g., raw materials commercially available from a number of sources. In a second embodiment, the composite powder comprises materials from scrap corrosion-resistant ceramic materials such as evaporation boats or side dams. As the recycled materials comprise both BN and TiB2 and having a reduced particle size in the controlled range of 1 to 1000 μm, they may be used in place of a virgin mix of BN and TiB2 in a number of applications.

The composite powder comprising $TiB_2$ and BN components is present in an amount from 5 to 60 wt % of the final weight of the coating composition. In one embodiment, the amount ranges from 10 to 50 wt. % of the composition. In second embodiment, from 15 to 45 wt. %. In a third embodiment, from 25 to 45 wt % of the composition. The ratio of BN to $TiB_2$ ranges from 1:7 to 20:1 in one embodiment. In a second embodiment, in a range of 1:6 to 9:1. In a third embodiment, from 1:5 to 8:1.

In one embodiment, the composite powder composition comprises 35-80 wt. % of BN and 20-80 wt. % of TiB2. In another embodiment, the composite powder composition comprises 40-65 wt. % and 25-65 wt. % TiB2.

In one embodiment, the composite size ranges from 10 to 800 μm, and in a second embodiment from 20 to 500 μm. In a third embodiment, the composite has an average primary particle size of 3 to 10 μm.

In one embodiment, the composite powder has a BET surface area of 0.1 to 20.0 $m^2/g$. In a second embodiment, the composite powder has a BET surface area of 1 to 10.0 $m^2/g$. As used herein, the surface area is the value obtained by the method of Brunauer, Emmett and Teller, J. Am. Chem. Soc., 60, 309 (1938), and expressed as B.E.T. surface area.

In one embodiment, the composite powder product has a mechanical strength of >50 Mpa. In a second embodiment, the composite powder product has a mechanical strength of >100 MPa, and in a third embodiment, a mechanical strength of <500 MPa.

In one embodiment, the composite powder has a dispersion index of 0.05 to 0.9. In a second embodiment, the powder has a dispersion index of 0.1 to 0.7.

Depending on the final property of the coating composition and the desired end-use applications, the composite powder may further comprise optional components. In one embodiment, the composition further comprises at least one of an electrically conductive component selected from the group of borides of Zr, Al, Cr and mixtures thereof, and carbides of tungsten, Si, Ti, and Cr, and mixtures thereof. In yet a third embodiment, the composite powder may further comprise metallic nitride, metallic carbide and metallic oxide. In one embodiment, the composite further comprises at least a non-conductive component such as aluminum nitride, silicon nitride, nitride of a rare earth metal compound, alumina, silica, boric oxide, boron oxynitride, oxide of a rare earth metal compound, oxide of an alkaline earth metal, and mixtures thereof. In yet another embodiment, the additional component is TiN. In a fourth embodiment, the optional component in the composite powder is a metal, metal alloy, cermet, or powder combinations thereof In a fifth embodiment, the BN and $TiB_2$ composite further comprises ceramic materials in coating compositions of the prior art, e.g., monomolybdenum boride powder, dimolybdenum boride powder, chromium monoboride powder, chromium diboride powder, zirconium diboride powder, tantalum diboride powder, tungsten carbide powder, chromium carbide powder, monomolybdenum carbide powder, dimolybdenum carbide powder, cobalt powder, cobalt alloy powder, chromium powder, chromium alloy powder, molybdenum powder, molybdenum alloy powder, tungsten powder, tungsten alloy powder, and diamond dust.

Composite Powder Comprising BN and $TiB_2$ From Scrap Corrosion-Resistant Ceramic Materials In the manufacture of metallization boats, the boats are typically prepared by molding a mixture comprising various components to form a green body, die pressing the body and/or hot pressing the body, then machined to the desired configuration and/or dimensions via manual or automatic means including band saws, grinders, Electro Discharge Machining (EDM), Electro Discharge Grinding (EDG), laser, plasma, ultrasonic machining, sandblasting, and water jet, etc. In the process, scrap materials are generated in various forms, shapes, and sizes from saw dust type of materials to chunks or finished metallization boats not meeting the specified dimensional tolerances. After boats of the desired dimensional tolerances are machined, they are qualified against a number of other specifications including resistivity, strength and other physical characteristics to minimize metallizing system variability. Machined boats failing these tests are discarded as scrap materials as well. In the field in a metallization process, scrap materials are generated from the discarded metallization boats. Scraps from the above processes, i.e., the making of metallization boats, discarded boats not meeting specifications, and spent boats from vacuum metallization operations may be gathered recycled for subsequent uses in the present invention as coating compositions.

It should be noted that sources for composite powder comprising BN and $TiB_2$ are not limited to discarded or scrap metallization boats. Other sources are feasible, including but not limited to discarded or scrap side dams. Side dams are ceramic parts for use in continuous casting of steel and aluminum, comprising BN and $TiB_2$ among other components. In one embodiment, the side dams have compositions are as disclosed in U.S. Pat. Nos. 5,336,454, 5,401,696; and 6,745,963.

The composition of the scraps and discarded ceramic sources varies depending on the source of the boats or the side dams, i.e., the manufacturer. Generally, the corrosion-resistant composition generally comprises: a) an electrically conductive component such as $TiB_2$, zirconium diboride, titanium nitride, silicon carbide, chromium carbide, and mixtures thereof; and b) a non-conductive component such as BN, aluminum nitride, silicon nitride, nitride of a rare earth metal compound, alumina, silica, boric oxide, boron oxynitride, oxide of a rare earth metal compound, oxide of an alkaline earth metal, and mixtures thereof. The BN is either hexagonal BN or amorphous BN, or its mixtures.

In one embodiment, BN and $TiB_2$ components are from scrapped materials comprising 10-60 wt. % BN, 0 to 60 wt. % of at least AlN or SiN, and 30 to 70 wt. % of at least TiB2, zirconium boride, aluminum boride, chromium boride, silicon carbide, titanium carbide, and chromium carbide. In another embodiment, the BN and $TiB_2$ components are from recycled metallization boats comprising 20 to 50 wt. % $TiB_2$; 23.6 to 41 wt. % of B, predominantly provided in the form of $TiB_2$ and BN; 22.5 to 31 wt. % nitrogen, predominantly provided in the form of BN; and 0.3 to 1.5 wt. % calcium (Ca), predominantly provided in the form of calcium borate. In yet another embodiment wherein the scrap materials comprise discarded or used metallization boats, the materials may further comprise less than 3 wt. % of a composition typically used to provide wetting enhancement and/or corrosion resistant properties to metallization boats, such as TiC, ZrC, HfC, VC, NbC, TaC, $Cr_3C_2$, $Mo_2C$, WC, a metal alkoxide, a silicon alkoxide, compounds, derivatives and mixtures thereof.

In one embodiment where the scraps originate from different sources and thus of different compositions, specifically, first representative samples from different batches may be analyzed for chemical compositions and classified into different batches according to their composition. Some of the scraps in one recycling batch may be mixed with batches of the different compositions so as to obtain a batch with a composition within a prescribed range for final solid particles having desired compositional make-up.

Initially, the materials from the same collection batch or different batches may be optionally mixed together using a double cone mixer, V-shaped mixer, drum-type mixer, super mixer, Henschel mixer, Nauta mixer, etc. The size reduction to final solid particles may be carried out in a process combining one or more of compaction, impaction, shearing forces, using equipment known in the art such as jaw crusher, roll crusher, grinder, reversible impactor, and the like. The finer portion of the scrap materials may be milled in the milling stage using tools knowing in the art, including grinding mill, such as a ball, pebble, rod, or tube mill, a hammer (impact) mill or a disk (attrition) mill. Milling can be dry milling only, wet milling only (milling mixture including milling media and milling liquid), or a combination of both depending on the compositional make-up of the scrap materials in the recycled batch and the desired properties of the final composite powder comprising BN and $TiB_2$. After milling, the composite powder is classified using equipment and processes known in the art, e.g., a continuous centrifugal device or a hydrocyclone. Additionally, any of the above steps can be repeated for the resulting composite powder to have the desired compositional make up and sizes, e.g., in the range of 1 to 1000 μm.

Composite Powder Comprising BN and $TiB_2$ From Virgin Materials. In one embodiment, the composite powder comprises a mixture of BN and $TiB_2$ with the boron nitride used is hexagonal BN, commercially available from a number of sources, e.g., Momentive Performance Materials Inc., Sintec Keramik, ESK, Kawasaki Chemicals, and St. Gobain Ceramics. In one embodiment, BN is surface-treated or "coated" to further impart desirable characteristics to the coating. Examples of surface coating materials for BN include, but are not limited to, alumina, zirconate, zirconium aluminate, aluminate, silanes, and mixtures thereof. The size of the BN powder depends on the end-use applications. In one embodiment, BN has an average particle size of less than 100 μm. In a second embodiment, less than 50 μm. In a third embodiment, in the range of 5 to 50 μm. In a fourth embodiment, between 5 to 30 μm. In a fifth embodiment, the BN has a size of less than 1 μm, i.e., a nanosize particles ranging from 10 to 800 nm, and in one embodiment, from 10 to 100 nm, made by processes known in the art including but not limited to sonication and plasma-assisted pulsed laser deposition.

Titanium diboride ($TiB_2$) is commercially from a number of sources, e.g., Momentive Performance Materials Inc., Prematech LLC, Reade Advanced Materials, and Ceradyne Corp. The size of the $TiB_2$ depends on the end use coating applications. In one embodiment, $TiB_2$ has an average particle size of <20 μm. In a second embodiment, of a size <15 μm. In a third embodiment, of a size <5 μm. In a fourth embodiment, the $TiB_2$ has a size of less than 100 nm, after milling in a high-energy ball-milled process, a sonification process, or other processes known in the art to reduce ceramic materials to nanoparticle sizes.

In one embodiment, the composite $TiB_2$—BN powder is formed by heating a mixture of $TiB_2$—BN to a sufficient temperature to form a coherent mass without melting. In yet another embodiment, a TiB$_2$—BN composite provided as a separate component of the coating composition, wherein the mixture of TiB$_2$—BN is heated to a sufficient temperature to form a coherent mass without melting.

In yet another embodiment, the composite is formed by forming a green body having a theoretical density (TD) of at least 50%, comprising a mixture of TiB$_2$—BN and then die pressing the body. In one embodiment, the green body is next heated to a densification temperature of at least about 1000° C. and at a pressure of at least 100 Mpa. In another embodiment, the green body is isostatically hot pressed at a temperature of 1800 to 2200° C. and a pressure of 1 to 100 Mpa. In yet another embodiment, the hot pressing is done after uniaxial pressing or cold isostatic pressing of 0.5 to 200 Mpa. In one embodiment, the green body is densified through pressureless sintering at a temperature above 1000° C. In another embodiment, the green body is formed in a process such as slip casting, tape casting, fugitive-mold casting, or centrifugal casting. In the next step, the green body is roughly crushed using crushing means known in the art including a crusher, hammer mill, feather mill, etc., for rough crushing. After the crushing stage, the crushed materials can be optionally fed directly into a mill for the milling stage, or first classified according to sizes so that the bigger pieces can be recycled back to the crushing stage, and the finer portion going on to the milling stage. Milling can be dry milling only, wet milling only (milling mixture including milling media and milling liquid), or a combination of both depending on the compositional make-up of the materials to be milled.

Composite Powder Comprising BN and TiB$_2$ Generated From a Reaction Procedure: In yet a third embodiment, the composite powder is generated from a reaction procedure. An example of a reaction procedure to generate the composite powder is as disclosed in U.S. Pat. No. 5,100,845, wherein a mixture of at least one titanium-containing compound, at least one boron-containing compound, particulate carbon and at least one nitrogen-containing compound is heated to an elevated temperature, e.g., of at least 1400° C. for a sufficient period of time to produce a synthesized titanium diboride and boron nitride composite mixture.

In one embodiment, the BN and TiB$_2$ composite powder is generated using a BN substrate and a titanium source, with the BN substrate being hexagonal BN, which is commercially available from a number of sources. The titanium source can preferably be titanium in any reducible form, or it can be a reduced titanium source. Thus, reducible or reduced forms such as TiO, TiO$_2$, Ti$_2$O$_3$, Ti$_3$O$_5$, TiC, TiN, TiH$_2$, Ti, and reduced titanium halides. In one embodiment, the Ti source is TiO$_2$. In one embodiment, a reducing agent can be used to reduce the titanium source, e.g., a carbon source, a hydrogen source such as hydrogen gas or a hydrocarbon.

The BN and TiB$_2$ composite powder in one embodiment is made in one embodiment by first mixing and heating the individual reactants. This mixing can be done using either a dry mixing or wet mixing method as known in the art. In one embodiment, the intimate mixing is carried out such that the average reactant particle size is less than about 20 microns and there are substantially no discrete reactant areas greater than about 50 microns. In the next step, the materials are reacted under sufficient conditions to produce the BN and TiB$_2$ composite powder. In one embodiment, the reaction is carried out by heating at a temperature of at least 1000° C., e.g., from 1200 to about 2000° C. In yet another embodiment, the heating is done under an inert or reaction-compatible atmosphere, e.g., in the presence of argon, helium, neon, hydrogen, carbon monoxide, xenon, krypton, and mixtures thereof.

Component B—Matrix Component: As used herein, the term metal or metallic refers to metal, metal alloy, cermet, or combinations thereof In one embodiment, the coating composition further comprises at least a metal, metal alloy, or cermet powder component, a high temperature polymer, or mixtures thereof in an amount of 1 to 95% by weight of the coating composition, which forms a matrix for the coating composition.

In one embodiment, the metallic component is a metal powder selected from the group of W, Co, Cr, Fe, Ni, Mo, Al, Si, Cu, Y, Ag, P, Zr, Hf, B, Ta, V, Nb, and mixtures thereof. In a second embodiment, the metal-containing component forms a composite with the BN/TiB$_2$ for a coating layer that adheres to the substrate to be coated. In a third embodiment, the metallic component is a tungsten carbide cermet (WC—Co—Cr).

In one embodiment, the metal powder is an alloy containing at least one of Ni, Cr, Ti, or Si that bonds well to a steel substrate. In a second embodiment, the metal powder comprises 10-25 wt. % molybdenum, from 55-70 wt % of a nickel alloy, and from 5-25 weight % of a chromium metal, chromium carbide, molybdenum carbide, tungsten carbide or mixtures thereof In a third embodiment, the metal powder comprises an alloyed metal having a melting point in the range of about 750-1000° C., including at least one of Ag, Cu, Mn, Cr and Si. In a fourth embodiment, the metal powder is a self-fluxing alloy containing nickel, cobalt and/or iron with up to 20% chromium and small amounts of boron, silicon and carbon. In a fifth embodiment, the metal powder is for a high temperature application, containing at least 0.5 to about 3% hafnium, with the balance chosen from the group consisting of nickel, cobalt, and mixtures thereof. In a sixth embodiment, the metal powder contains 30-70 wt. % molybdenum; 1-40 wt. % cobalt; and 10-30 wt. % at least one of Ni, Cr, Ti, or Si.

In one embodiment, instead of the metallic component, the coating composition the matrix component comprises 1 to 95% by weight of a high temperature polymer, e.g., a polymer selected from the group consisting of polyimides, polyamide imides, polyester imides, aromatic plastics, and a mixture thereof.

In one embodiment and in addition to the metallic matrix component, the coating composition further comprises 1 to 30% by weight of a high temperature polymer particular, e.g., a polymer selected from the group consisting of polyimides, polyamide imides, polyester imides, aromatic plastics, and a mixture thereof.

Component C—Optional Binders/Other Components: In one embodiment to increase porosity of the coating on a part or component, a binder having a size range of 1 to 200 μm can be blended into the composition material in an amount of 1 to 30 wt % prior to the (flame) thermal spraying or plasma spraying process. The fugitive binder is vaporized, burned out or leached to yield a porous and permeable coating. Examples of binders include synthetic acrylate or methacrylate resins, a thermally cured phosphate binder, a thermally cured potassium silicate binder, and mixtures thereof.

Depending upon the final application, additional components may be incorporated into the coating composition. The additional components, can comprise mono-modal or multi-modal particles having a size distribution smaller than the average particle size of the agglomerate. One of the possible optional components can be an insoluble carbon such as anthracite, carbon black, graphite, carbon nanotubes, buckminsterfullerines or combinations of the forgoing. Other additional components can be lubricants, glidants, flow aids, dispersants, surfactants or anti-foaming agents, which will be discussed below. Other additional components may be other types of ceramic or matrix phase so as to modify the properties of the desired composite structure. Other examples of possible additives to the coating composition are solid lubricant particles such as graphite, molybdenum disulphide, calcium fluoride, bentonite, mullite, agents which form pores in the final coating structure, or materials that will enhance the tribological properties of the final coating composition. In one embodiment, the coating composition further comprise solid lubricant powders coated with a metal or alloy, or particles made up of high-temperature polymers, having a size of from 0.5 to 40 μm, which metal or polymer can be the same or different from the material comprising the matrix component.

In one embodiment, the coating composition further comprises at least one of an electrically conductive component selected from the group of borides of Zr, Al, Cr and mixtures thereof, and carbides of tungsten, Si, Ti, and Cr, and mixtures thereof. In yet another embodiment, the coating composition may further comprise metallic nitride, metallic carbide and metallic oxide. In one embodiment, the coating composition further comprises at least a non-conductive component such as aluminum nitride, silicon nitride, nitride of a rare earth metal compound, alumina, silica, boric oxide, boron oxynitride, oxide of a rare earth metal compound, oxide of an alkaline earth metal, and mixtures thereof. In yet another embodiment, the additional component is TiN.

Method for Forming Coating Composition: In one embodiment of the invention, the coating composition comprises composite particles of boron nitride (BN)-titanium diboride ($TiB_2$) in a matrix-forming metal or metal alloy. In a second embodiment, the composite coating composition comprises agglomerated particles with metal or metal alloy powder, with each agglomerate comprising a plurality of $BN/TiB_2$ composite particles, for the composite particles to be mixed with the metal or metal alloy powder, forming an in-situ composite material composed of metal and $TiB_2/BN$ components in the thermal spraying process. In yet another embodiment, the coating composition comprises composite particles of $BN/TiB_2$ coated with a metal or metal alloy powder, for subsequent use in coating applications such as thermal spraying, dipping, painting, brushing, plasma spraying, and the like, wherein the $TiB_2/BN$ composite material coated with metal and/or alloys is formed in-situ in the coating process of thermal spraying, dipping, painting, brushing, plasma spraying, and the like.

In one embodiment, the BN/TiB2 composite is blended or coated with the metal/cermet powder using processes known in the art, including dry blending, electrochemical coating, fluidized bed, CVD, or spray-drying the BN/TiB2 composite and the metal/cermet powder together, for composite particles having a central core coated with a layer of metal. The metal powder coated BN/TiB2 composite is applied onto a contact surface by known thermal coating processes known in the art. In one embodiment, a sintered coating powder composition is prepared by heating the mixture of metal coated BN/TiB2 composite powder composition to a temperature from about 850° C. and 1600° C., in one embodiment from 1000° C. to 1400° C., for a period of time sufficient to ensure that at least 10% of the alloying metal diffuses into the BN/TiB2 particles. In a second embodiment, the composite powder is heated to a temperature of 1000° C. to 1400° C.

In the next step, the sintered product is crushed/milled to a desirable size depending on the characteristics desired in a specific application. The sintered powder is applied by detonation or plasma spray deposition onto substrates forming a coating layer.

In one embodiment, a sealing composition is prepared by mixing a composite of $TiB_2$—BN with a sealing agent comprising an organic silicon polymer in which the carbosilane bonds —(Si—C)— and/or a siloxane bond —(Si—O)— remain when ceramic conversion is carried out. The $TiB_2$—BN composite is prepared by sintering a mixture of BN and TiB2 powders or green body at a sufficiently high temperature to form a composite. The mixture is then crushed/milled to form a fine composite powder product primarily comprising BN/TiB2 with a surface area of 0.1 to 2.0 m2/g and a particle size in the range of 5 to 500 μm. The $TiB_2$—BN composite containing composition can be used in an aerosol can with a conventional propellant gas such as carbon dioxide for subsequent spraying applications.

After the metallic powder is thermally sprayed onto a substrate forming a first metallic coating layer, the $TiB_2$—BN sealing composition is applied onto the metal coating layer by brush painting, dipping or spraying on the metallic substrate to fill the voids in the metallic coating layer. In the next heating step, the $TiB_2$—BN composite thermally decomposes and fuses into the metallic matrix, forming a $TiB_2$—BN-metallic composite.

Articles to be Coated by the Composition of the Invention: In coating applications, the composite powder with TiB2 displays excellent properties such as high thermal conductivity, electrical conductivity, combined hardness and strength, and resistance to attack by molten metals. In various applications including but not limited to coating applications, the composite powder with BN displays properties inherent to BN such as electrical insulation, improved thermal shock resistance, resistance to attack by molten metals, high temperature stability and lubricity may be used in addition to or to replace certain materials such as PTFE, graphite, $MoS_2$, $WS_2$, MnS and the like.

The coating composition is suitable for use in applications requiring both improved wear resistance and friction modification properties, e.g., coating sliding or rolling or fretting or impacting members or parts. Examples include but are not limited to coating applications requiring improved thermal shock resistance, improved non-wetting of metal and improved corrosion resistance, e.g., coating for nozzles; wear-resistant coatings for engine parts; wear resistant coatings for forming tools such for use in operations including rolling, spinning, shearing, bending, drawing, swaging, forging, coining, extrusion, injection molding, compression molding, transfer molding, drawing, and laminating to form metals, plastics, elastomers, ceramics, and composites into a shaped object; coating for internal combustion or gas turbine engine components; coating for firearm parts such as the wear surface of a breech, a barrel, a choke, a flash suppressor, a gas port, or any firearm part that is subject to locking, ejection, sliding, rotating, or bearing; coating for components used in size reduction equipment such as mills, classifiers, cyclones, screens, etc. In one embodiment, the coating is to be applied onto turbines, valves and gate seats, pump seals, ducting, fan blades, thread guides, wire drawing capstans and mandrels.

As used herein, "substrate" refers to the part, member, or component to be coated. The material of the substrate to be coated is selected from metals, metal alloys, cermets, ceramics and glass, though not limited thereto. In one embodiment, a high temperature thermoplastic is used as the material for the substrate. Examples of metal materials for the substrate to be coated include Al, Fe, Si, Cr, Zn, Zr, Ni and alloys thereof Examples of ceramic materials for the substrate include metallic nitride, metallic carbide and metallic oxide such as alumina, aluminum nitride, silicon nitride and silicon carbide. Examples of glasses include quartz glass.

Method for Applying the Coating Composition. The coating of the invention can by applied by any coating process known in the art, including but not limited to detonation or plasma spray deposition, high velocity combustion spray (including hypersonic jet spray), flame spray and so called high velocity plasma spray methods (including low pressure or vacuum spray methods). Illustrative, non-limiting examples of the plasma gas that may be used include nitrogen/hydrogen, argon/hydrogen, argon/helium and argon/nitrogen. No particular limitation is imposed on the thermal spraying conditions.

In one embodiment, the coating composition is heated in a plasma or combustion flame, or in a high velocity oxy fuel (HVOF) or high velocity oxy air (HVAF) combustion flame and deposited by projecting the composition onto a surface to form a coating.

In one embodiment, the substrate is first prepared by etching or patterning, creating a pattern of rough areas prior to coating. After the optional surface preparatory step, the thermal coating is applied by first spraying the coating onto a substrate using a conventional spray gun. The resulting coating is next fused by heating with a flame torch or a furnace, for example to 950° C. for sufficient time for the coating to coalesce.

In yet another embodiment, the thermal coating is applied by heating the substrate to be coated such that when the BN/TiB2 composite containing coating is deposited onto the substrate, the coating is sufficiently heated to diffuse and become entrapped on the substrate forming a coating.

In one embodiment, the coating comprising $TiB_2$—BN composite may be brush painted or sprayed on a substrate or the substrate may be dipped in the composition to produce an adhered powder coating. The powder-containing composition of this invention may also be used in an aerosol can with a conventional propellant gas such as carbon dioxide. In this embodiment, the novel powder-containing composition may be dispersed from the aerosol can directly onto the surface of a substrate to produce an adhered coating of the powder that will remain on the substrate. Any suitable propellant gas used in aerosol applications may be employed with the powder-containing composition of this invention.

In yet one embodiment, the $TiB_2$—BN composite materials are used in a thermal based coating, specifically a $TiB_2$-M based coating with more than 50 vol. % $TiB_2$ hard phase particle in a metal or metal alloy (M) matrix as disclosed in U.S. Pat. No. 5,837,327. In one embodiment, the $TiB_2$—BN composite powder of reduced size is used in a protective coating composition for metallic film recording mediums as disclosed in U.S. Pat. No. 5,454,168. The BN as inherently present the materials brings added value such as increased lubricity, corrosion resistance, and abrading properties to such coatings, prolonging the life of the protected parts with its inherent lubricity properties.

In yet another embodiment, the $TiB_2$—BN composite powder may be incorporated into erosion-resistant coatings, either electroplating or electroless-plating applications, along the line of the composition disclosed in US Patent Application No. 2005/0112399, of use with turbine components. In one embodiment, the $TiB_2$—BN composite materials are used in a composition comprising ceramic coatings and alloys of refractory metals, with the $TiB_2$ and BN mixture of the invention providing added properties such as lubricity and increased hardness to the coating, with the TiB2/BN composite powder mixture comprises 35-80 wt. % of BN and 20-80 wt. % of TiB2, and an average particle size of less than 100 µm.

In another embodiment, the $TiB_2$—BN composite materials may be used in an abradable thermal spray coating having a pluralities of subparticles of BN and subparticles of metal or metal alloys along the line of the coating disclosed in U.S. Pat. No. 5,049,450 and US Patent Application No. 2005/0155454. In yet embodiment, they can be used in a thermal spraying powder along the line disclosed in US Patent Application No. 2004/0194662, with the $TiB_2$ being used in addition to or in place of the ceramic materials such as $ZrB_2$, boron carbide, SiC, TiC, WC, and diamond dust.

In one embodiment, the $TiB_2$—BN composite is used in a thermal spray coating, wherein the matrix forming metal, metal alloy, or high-temperature polymer is present as a metal cladding on the composite powder. In one embodiment, the metal coated $TiB_2$—BN composite is used in a thermal spray coating comprising a mixture of metal-clad $TiB_2$—BN composite particles and unclad $TiB_2$—BN composite particles or other optional lubricant particles. In a second embodiment, the matrix-forming metal alloy is selected from the metals Ni, Co, Cu, Fe, Al and combinations and alloys thereof, e.g., NiCrAl, NiCr, CuAl and AlSi, as disclosed in US Patent Publication No. 20050287390A1 and U.S. Pat. No. 5,702,769.

The coating on the substrate surface in one embodiment has a thickness of 50 to 500 µm. In a second embodiment, 150 to 300 µm. In a third embodiment, a thickness of >500 µm. It should be note that a coating of more than 500 µm thick can be too thick with a risk of delamination.

In one embodiment, the coating has a surface roughness of up to 60 µm, and of up to 20 µm in a second embodiment.

EXAMPLE

Examples of the invention are given below by way of illustration and not by way of limitation.

Example 1

A green body comprising 45 wt. % boron nitride and 65 wt. % of titanium diboride having a theoretical density of 60% is heated to a densification temperature of 1400° C. and a pressure of about 100 MPa for a theoretical density of at least 90%. The body is crushed to smaller pieces using a hammer mill then milled using a disk (attrition) mill. The milled powder is screened, e.g., through a Tyler mesh screen to obtain a composite powder having an average particle size of 15-30 µm. The powder is mixed with a fine powder of aluminum powder containing 12 wt. % of silicon. An organic binder (UCAR Latex 879) is mixed in with the metal and composite powder to form a slurry. The mixture is heated to about 150° C. and stir blended until the material is dried and an agglomerated powder is formed. The powder is then screened a size of 40 to 210 µm. The powder is sprayed with a plasma gun onto a substrate of a coating of 30 µm.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

All citations referred herein are expressly incorporated herein by reference.

What is claimed is:

1. A coating composition for use on a contact surface, comprising 5 to 60 wt % total of composite powder having an average primary particle size ranging from 1 to 1000 µm, the balance comprising (i) a matrix-forming metal, metal alloy or high-temperature polymer, and (ii) a binder chosen from an acrylate resin, a methacrylate resin, a thermally cured phosphate binder, a thermally cured potassium silicate binder, or mixtures of two or more thereof; wherein the composite powder comprises $TiB_2$ and BN in a ratio of BN to $TiB_2$ of 1:7 to 20:1.

2. The coating composition of claim 1, wherein the composite powder has a BET surface area of 0.1 to 20.0 $m^2/g$.

3. The coating composition of claim 2, wherein the composite powder has a BET surface area of 0.3 to 7.0 $m^2/g$.

4. The coating composition of claim 1, wherein the matrix-forming metal alloy is an alloy selected from the group consisting of W, Co, Cr, Fe, Ni, Mo, Al, Si, Cu, Y, Ag, P, Zr, Hf, B, Ta, V, Nb, and alloys thereof.

5. The coating composition of claim 1, wherein the matrix-forming metal is selected from the group consisting of Ni, Co, Fe and alloys thereof.

6. The coating composition of claim 1, wherein the matrix-forming high-temperature polymer is selected from the group consisting of polyimides, polyamide imides, polyester imides, aromatic plastics, and mixtures thereof.

7. The coating composition of claim 1, wherein the matrix-forming metal alloy further comprises a high-temperature polymer selected from the group consisting of polyimides, polyamide imides, polyester imides, aromatic plastics, and mixtures thereof, in an amount of 1 to about 30 wt % of the composition.

8. The coating composition of claim 1, wherein the composite powder comprises $TiB_2$ and BN in a ratio of BN to $TiB_2$ of 1:6 to 9:1.

9. The coating composition of claim 8, wherein the composite powder comprises $TiB_2$ and BN in a ratio of BN to $TiB_2$ of 1:5 to 8:1.

10. The coating composition of claim 1, wherein the composite powder has an average primary particle size ranging from 10 to 800 µm.

11. The coating composition of claim 10, wherein the composite powder has an average primary particle size ranging from 20 to 500 µm.

12. The coating composition of claim 1, wherein the composite powder has an average primary particle size ranging from 3 to 10 µm.

13. The coating composition of claim 1, wherein the composite powder has a mechanical strength of >50 MPa.

14. The coating composition of claim 1, wherein the composite powder is generated from one of scrapped metallization boats, scrapped side dams, and mixtures thereof.

15. The coating composition of claim 1, wherein the composite powder is from scrapped materials containing:
   10-60 wt. % BN;
   1 to 60 wt. % of $TiB_2$;
   0 to 60 wt. % of at least one of a nitride of the elements Al, Si, Fe, Co, Ni and mixtures thereof; and
   30-70 wt. % of at least a material selected from the group of borides of Ti, Zr, Al, Cr and mixtures thereof, carbides of Si, Ti, and Cr and mixtures thereof.

16. The coating composition of claim 1, wherein the composite powder is from scrapped materials containing:
   $TiB_2$, and BN, at least one of aluminum nitride or silicon nitride;
   at least a metal selected from W, Fe, Co, Nb, Mo, Hf, V and Ta; and
   at least an oxide selected from the group of CaO, MgO, $Al_2O_3$, $TiO_2$, $Y_2O_3$, YAG ($Al_5Y_3O_{12}$), YAP($AlYO_3$), and YAM($Al_2Y_4O_7$), compounds and mixtures thereof.

17. The coating composition of claim 1, wherein the composite powder further comprises at least one of nickel, chromium, iron, cobalt, aluminum and alloys thereof.

18. A coating composition for use on a contact surface, the composition comprising:
   a compound powder mixture comprising a metallic matrix selected from the group consisting of nickel, chromium, iron, cobalt, aluminum, tungsten and alloys thereof, a binder chosen from an acrylate resin, a methacrylate resin, a thermally cured phosphate binder, a thermally cured potassium silicate binder, or mixtures of two or more thereof, and a composite powder of $TiB_2$ and BN; wherein the metallic component is present from 40 to 95 wt. % of the final coating composition and the $TiB_2$ to BN ratio in the composite powder of $TiB_2$ and BN is in the range of 1:7 to 20:1.

* * * * *